(12) United States Patent
Shiraishi et al.

(10) Patent No.: US 7,999,887 B2
(45) Date of Patent: *Aug. 16, 2011

(54) LIQUID CRYSTAL DISPLAY DEVICE

(75) Inventors: Yasuhisa Shiraishi, Mobara (JP); Akiyoshi Tobe, Mobara (JP); Nobuyuki Koganezawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,658

(22) Filed: Sep. 8, 2010

(65) Prior Publication Data

US 2010/0328581 A1    Dec. 30, 2010

Related U.S. Application Data

(63) Continuation of application No. 11/960,789, filed on Dec. 20, 2007, now Pat. No. 7,796,213.

(30) Foreign Application Priority Data

Dec. 21, 2006   (JP) .................................. 2006-343703

(51) Int. Cl.
   *G02F 1/13357*   (2006.01)
   *F21V 7/04*   (2006.01)
(52) U.S. Cl. ........... 349/65; 362/607; 362/612; 362/626
(58) Field of Classification Search .................. 349/61, 349/65; 362/606, 607, 612, 625, 626; 385/146, 385/901
   See application file for complete search history.

(56) References Cited

U.S. PATENT DOCUMENTS

| 5,890,791 A * | 4/1999 | Saito ........................... 362/620 |
| 2004/0085751 A1 | 5/2004 | Okuwaki |
| 2007/0030698 A1 | 2/2007 | Miyashita |

FOREIGN PATENT DOCUMENTS

JP    2004-192909    7/2004

* cited by examiner

*Primary Examiner* — Dung Nguyen
*Assistant Examiner* — Tai Duong
(74) *Attorney, Agent, or Firm* — Antonelli, Terry, Stout & Kraus, LLP.

(57) ABSTRACT

A liquid crystal display device includes a display panel, a backlight which radiates light to the display panel, a light emitting element which is mounted on the backlight, and a light guide plate on which light from the light emitting element is incident. The light guide plate has an upper surface and a bottom surface. The bottom surface has grooves formed therein delimited by at least one surface which extends at a slant with respect to the bottom surface. A reflection sheet is provided which reflects the light radiated from the bottom surface. The grooves are formed to produce a first light which is reflected on the grooves and a second light which is radiated from the grooves and is reflected on the reflection sheet, and an asymmetric prism sheet is arranged on the light guide plate.

9 Claims, 18 Drawing Sheets

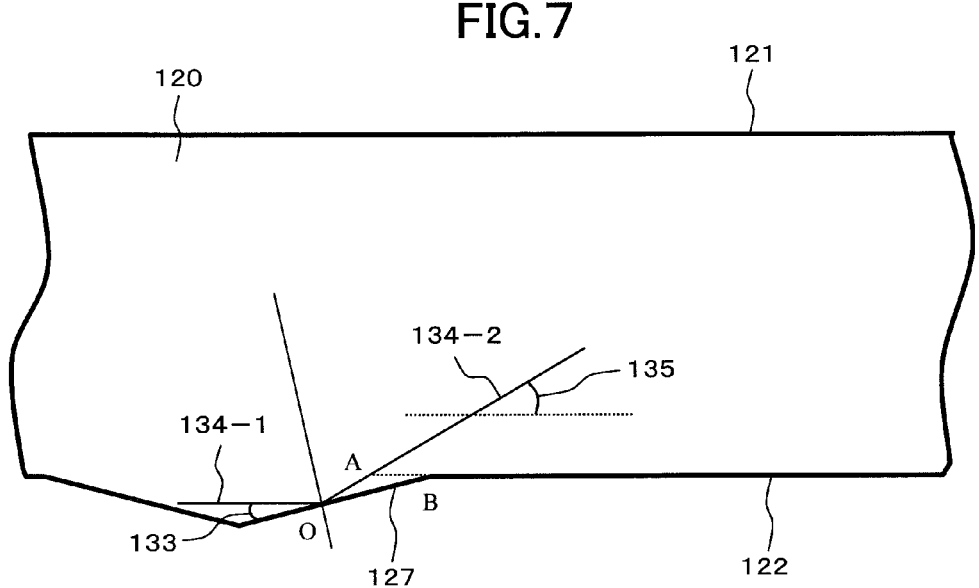
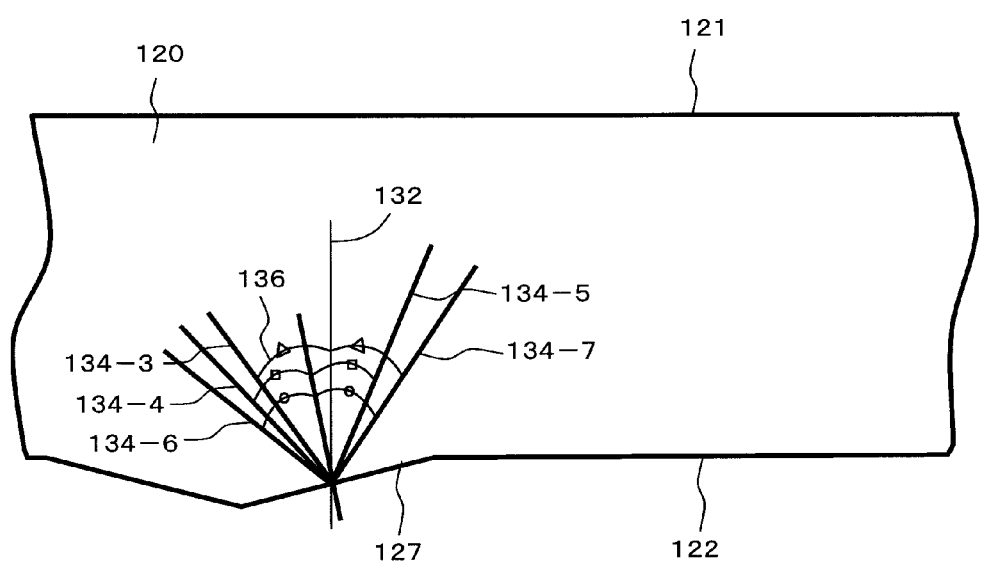

LIQUID CRYSTAL DISPLAY DEVICE

CROSS REFERENCE TO RELATED APPLICATION

This application is a continuation application of U.S. application Ser. No. 11/960,789, filed Dec. 20, 2007, now U.S. Pat. No. 7,796,213, the contents of which are incorporated herein by reference.

BACKGROUND OF THE INVENTION

1. Field of the Invention

The present invention relates to a light source of a non-self-luminous display device, and more particularly to a liquid crystal display device having a backlight which includes a light guide plate and uses an LED as a light emitting element.

2. Background Art

Recently, the liquid crystal display device has been popularly used as a display device. Particularly, the liquid crystal display device is used as a display part of portable equipment because of a reduced thickness, a reduced weight and small electric power consumption.

However, the liquid crystal display device is not self-luminous and hence, the display device requires a lighting means. In general, as a lighting device which is used for the liquid crystal display device, a flat lighting device referred to as a backlight is popularly used. Conventionally, although a cold cathode fluorescent tube has been used as a light emitting element (also referred to as a light source) of the backlight, an LED (light emitting diode) has been also recently used as the light emitting element.

The sidelight-type backlight includes a plate-like light guide plate. The light guide plate is made of a light-transmissive resin material or the like. The light emitting element is arranged on a side surface of the light guide plate. Light which is incident on the light guide plate from the light emitting element propagates in the inside of the light guide plate. Reflection and diffusion members such as grooves, projections or printed materials are formed in or on the light guide plate, and the light which propagates in the inside of the light guide plate is radiated toward a liquid-crystal-display-device side by the reflection and diffusion members.

In the light guide plate used in the display device, slight difference in quantity of light lowers quality of the display device. Accordingly, it is preferable to make quantity of light radiated from the light guide plate uniform over the whole area of a light radiation surface of the light guide plate.

JP-A-2004-192909 proposes a technique which changes an apex angle of prisms formed on a light radiation surface of a light guide plate corresponding to a distance from a light emitting element for making a quantity of light radiated from the light guide plate uniform.

SUMMARY OF THE INVENTION

In the backlight which uses the LED as the light emitting element, luminous points are arranged in a scattered manner. Accordingly, it has been difficult to radiate light uniformly on an incident side of the light guide plate. Particularly, spreading of light incident from the LEDs is narrow and hence, there has been a drawback that a quantity of light radiated from the light guide plate in the vicinity of the LEDs is decreased.

Further, with respect to the backlight which uses the LED as the light emitting element, a backlight which forms grooves in a bottom surface of a light guide plate for radiating light from the light guide plate has been practically used. However, the backlight has a drawback that an angle of light radiated from the light guide plate becomes non-uniform.

The present invention has been made to overcome the above-mentioned drawbacks. According to the present invention, there is provided a liquid crystal display device which includes a display panel, a backlight which radiates a light to the display panel, a light emitting element which is mounted on the backlight, and a light guide plate on which the light from the light emitting element is incident, wherein grooves are formed in a bottom surface of the light guide plate, a reflection surface is formed on a surface of the groove for reflecting the light with respect to a radiation surface of the light guide plate, and an angle of the reflection surface with respect to the bottom surface of the light guide plate is changed in the vicinity of the light emitting element.

Due to such a constitution, it is possible to increase a quantity of light radiated from the vicinity of an LED and hence, a dark portion formed between the LED and the LED or in the vicinity of the LED can be reduced.

Further, the liquid crystal display device according to the present invention includes a liquid crystal panel and a flat lighting device which radiates light to the liquid crystal panel, and a light guide plate having a light radiation surface and a bottom surface which faces the light radiation surface in an opposed manner is mounted on the flat lighting device. Further, the light guide plate includes side surfaces which intersect the light radiation surface or the bottom surface, a plurality of LEDs is mounted along a first side surface of the light guide plate, and a light radiated from the LED is allowed to be incident on the light guide plate from the first side surface thus making the first side surface as an incident surface of the light guide plate.

Grooves which reflect light and direct the light toward the light radiation surface are formed on the bottom surface of the light guide plate. An angle of the groove with respect to the bottom surface is set to a value which facilitates the radiation of reflection light from the light radiation surface in the vicinity of the LED.

Due to such a constitution, also in the vicinity of the LED, it is possible to increase the light radiated from the light guide plate.

BRIEF DESCRIPTION OF THE DRAWINGS

FIG. 7 is a schematic view showing the light guide plate of the liquid crystal display device of the embodiment according to the present invention;

FIG. 8 is a schematic view showing the light guide plate of the liquid crystal display device of the embodiment according to the present invention;

DETAIL DESCRIPTION OF THE EMBODIMENTS

Figure 1:
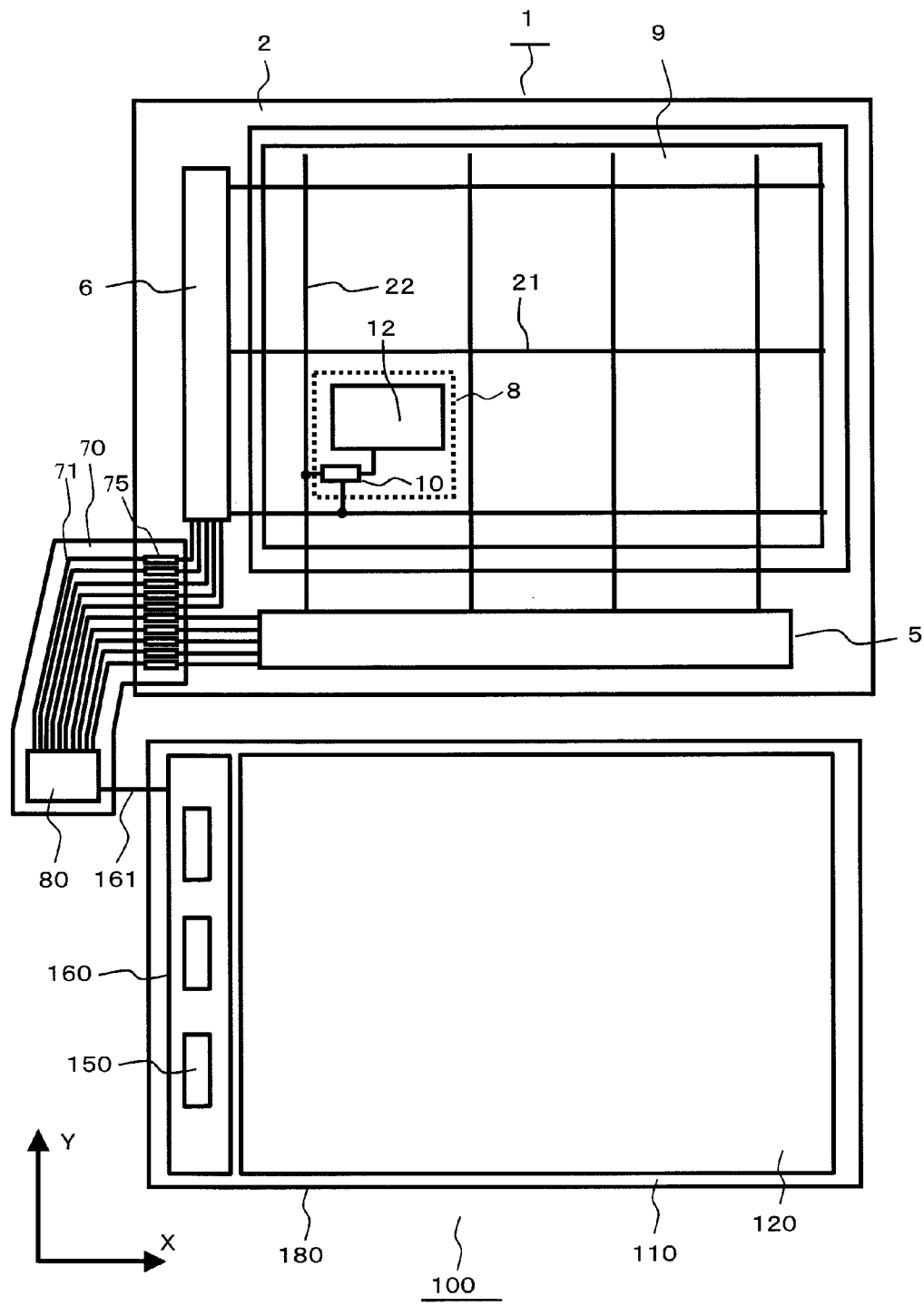
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display performed by the liquid crystal panel 1 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing case 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back-surface side or a front-surface side of the liquid crystal panel 1 in a stacked manner as viewed from a viewer. However, in FIG. 1, to facilitate the understanding of the constitution of the liquid crystal display device, the backlight 110 is illustrated in parallel to the liquid crystal panel 1.

The light guide plate 120 is formed in a substantially rectangular shape, and the LEDs 150 are arranged on a side surface of the light guide plate 120. Numeral 160 indicates a flexible printed circuit board which electrically connects the plurality of LEDs 150. The flexible printed circuit board 160 and the control circuit 80 are electrically connected with each other using a line 161. Here, to facilitate the understanding of the constitution of the liquid crystal display device shown in the drawing, a mold formed around the light guide plate 120 and the LEDs 150 is omitted.

Next, the liquid crystal panel 1 is explained. A pixel portion 8 of the liquid crystal panel 1 includes a pixel electrode 12. Here, the liquid crystal panel 1 includes a large number of the pixel portions 8 in a matrix array. However, to prevent the drawing from becoming cumbersome, in FIG. 1, only one pixel portion 8 is illustrated. The pixel portions 8 which are arranged in a matrix array form a display region 9, and the respective pixel portions 8 play a role of pixels of a displayed image and display an image on the display region 9.

In FIG. 1, gate signal lines (also referred to as scanning lines) 21 which extend in the x direction and are arranged in parallel in the y direction in the drawing and drain signal lines (also referred to as video signal lines) 22 which extend in the y direction and are arranged in parallel in the x direction in the drawing are provided. The pixel portions 8 are formed in regions which are surrounded by the gate signal lines 21 and the drain signal lines 22.

A switching element 10 is provided to the pixel portion 8. A control signal is supplied to the pixel portion 8 from the gate signal line 21 so as to control an ON/OFF state of the switching element 10. When the switching element 10 is turned on, a video signal which is transmitted via the drain signal line 22 is supplied to the pixel electrode 12.

The drain signal lines 22 are connected to a drive circuit 5 and the video signals are outputted to the drain signal lines 22 from the drive circuit 5. The gate signal lines 21 are connected to a drive circuit 6 and the control signals are outputted to the gate signal lines 21 from the drive circuit 6. Here, the gate signal lines 21, the drain signal lines 22, the drive circuit 5 and the drive circuit 6 are formed on the same TFT substrate 2.

Figure 2A:
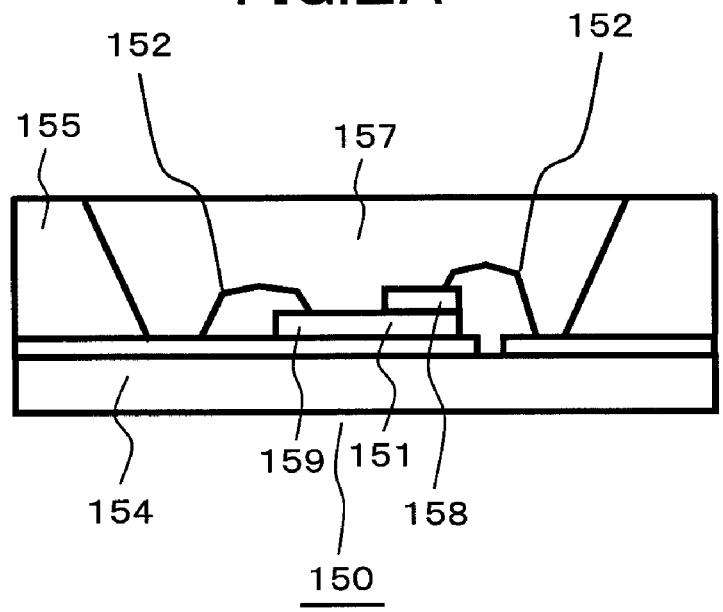
FIG. 2A and FIG. 2B are schematic views showing a light emitting diode of the liquid crystal display device of the embodiment according to the present invention.
Figure 2B:
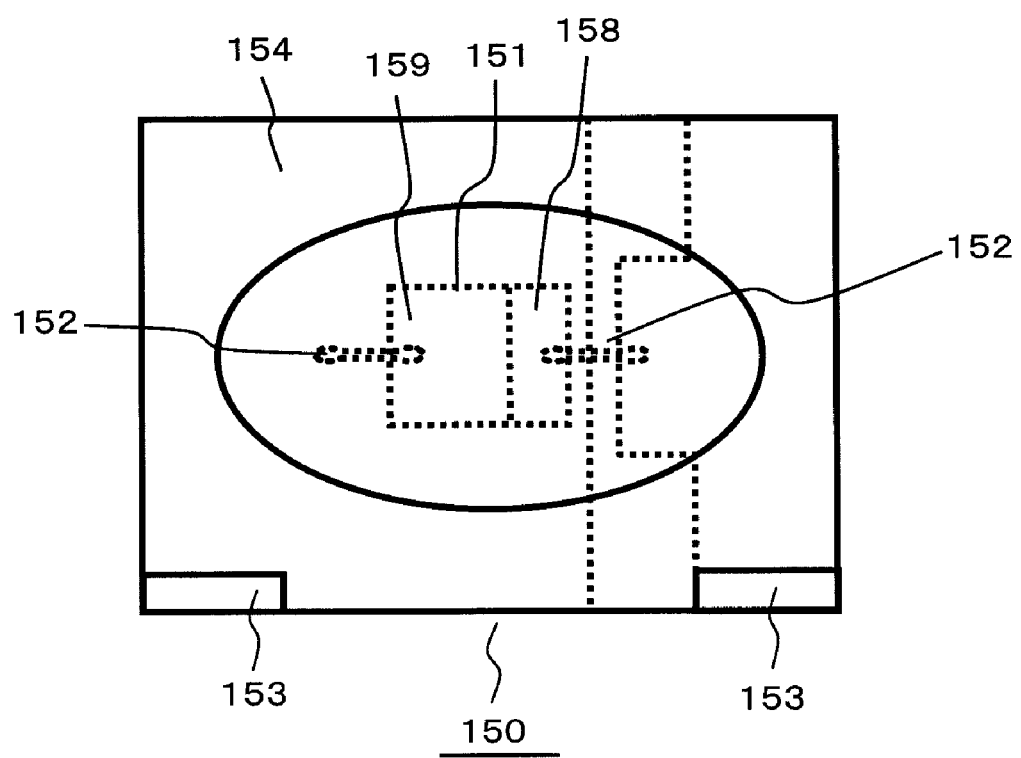

Next, FIG. 2A and FIG. 2B are schematic views of the LED 150 which constitutes a light emitting element, wherein FIG.

2A is a schematic cross-sectional view of the LED 150, and FIG. 2B is a front view of a light-radiation-surface-side of the LED 150.

The LED 150 is configured such that an LED chip 151 constituting a light emitting portion is mounted on a chip substrate 154. The LED chip 151 has a pn junction and light having a specific wavelength is radiated when a voltage is applied to the pn junction. A p electrode (anode) 158 is formed on a p-type semiconductor layer which forms the pn junction, and an n electrode (cathode) 159 is formed on an n-type semiconductor layer which forms the pn junction.

Wires 152 are connected to the p electrode 158 and the n electrode 159 respectively. With these wires 152, chip terminals 153 are electrically connected with the p electrode 158 and the n electrode 159. The chip terminals 153 are provided for connecting the LEDs 150 to an external device.

A fluorescent light emitting portion 157 may be formed on a light-radiation-surface side of the LED chip 151. The fluorescent light emitting portion 157 has a function of converting a wavelength of light which is emitted from the LED chip 151. Here, numeral 155 indicates a reflection portion capable of radiating light emitted from the LED chip 151 toward a front surface.

Figure 3A:
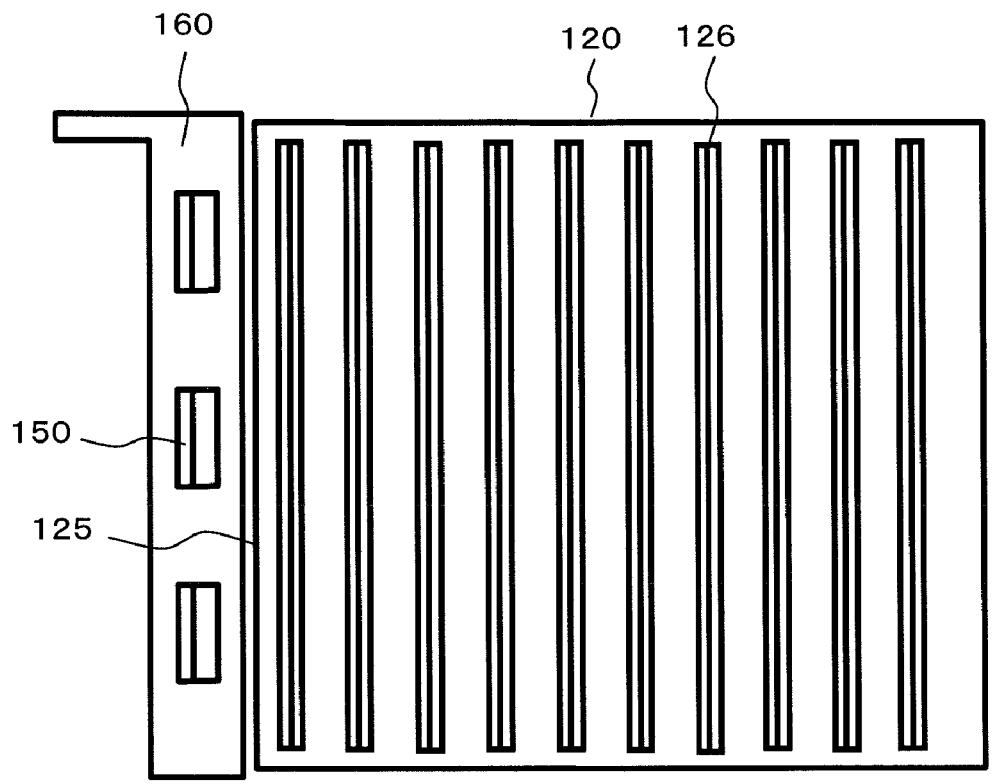
FIG. 3A and FIG. 3B are schematic views showing a light guide plate of the liquid crystal display device of the embodiment according to the present invention.
Figure 3B:
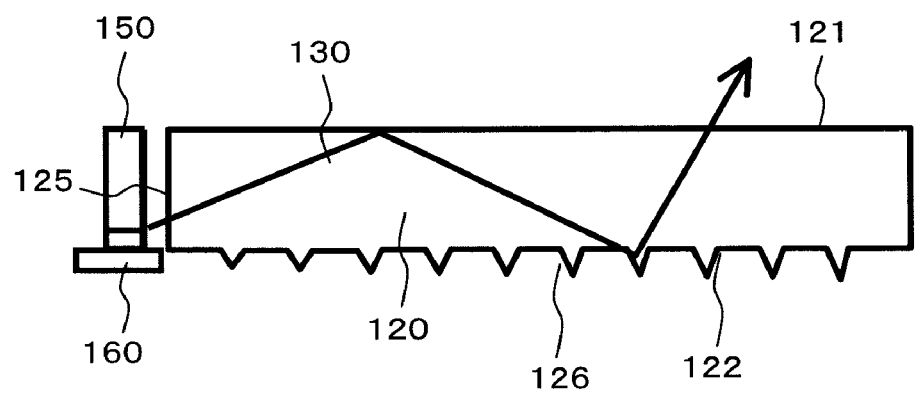

Next, FIG. 3A is a schematic plan view of the light guide plate 120, and FIG. 3B is a schematic side view of the light guide plate 120. As shown in FIG. 3A, the light guide plate 120 is formed in a rectangular shape and, as shown in FIG. 3B, the light guide plate 120 includes an upper surface 121 and a lower surface 122. The light guide plate 120 is made of a material such as polycarbonate or an acrylic resin which allows light to pass there through, and the light guide plate 120 is formed in a plate shape and has a thickness of 1.0 mm to 0.2 mm. Here, in FIG. 3B, although a cross section of the light guide plate 120 is described in a rectangular shape, the cross section of the light guide plate 120 may be formed in a wedge shape in which the thickness of the light guide plate 120 is decreased from an incident-surface-125 side toward the other side.

FIG. 3A and FIG. 3B show a positional relationship of the light guide plate 120 and the LEDs 150. The incident surface 125 is arranged on at least one side of the light guide plate 120, and in the vicinity of the incident surface 125, a plurality of LEDs 150 is arranged. The LEDs 150 are arranged above the flexible printed circuit board 160 along the incident surface 125.

The light which is radiated from the LED 150 is incident on the incident surface 125. Further, the upper surface 121 and the lower surface 122 of the light guide plate 120 are arranged to be substantially orthogonal to the incident surface 125, and grooves 126 having a V-shaped cross section are formed in the lower surface 122 as reflection portions.

As described above, the light guide plate 120 is made of transparent resin, and a refractive index of the light guide plate 120 is larger than a refractive index of air. Accordingly, a light which arrives at the upper surface 121 and the lower surface 122 with an angle larger than a specific angle (a critical angle) with respect to the normal direction of the respective surfaces is totally reflected. On the other hand, a light which arrives at the upper surface 121 and the lower surface 122 with an angle smaller than the specific angle (the critical angle) is radiated to the outside of the light guide plate 120.

A large part of the light which is incident on the inside of the light guide plate 120 has an angle larger than the critical angle with respect to the normal directions of the upper surface 121 and the lower surface 122 of the light guide plate 120 and advances in the inside of the light guide plate 120 while repeating the total reflection with respect to the upper surface 121 and the lower surface 122 of the light guide plate 120. The light which advances in the inside of the light guide plate 120 is reflected toward the upper-surface-121 side by the grooves 126 formed in the lower surface 122 and is radiated from the upper surface 121.

Figure 4A:
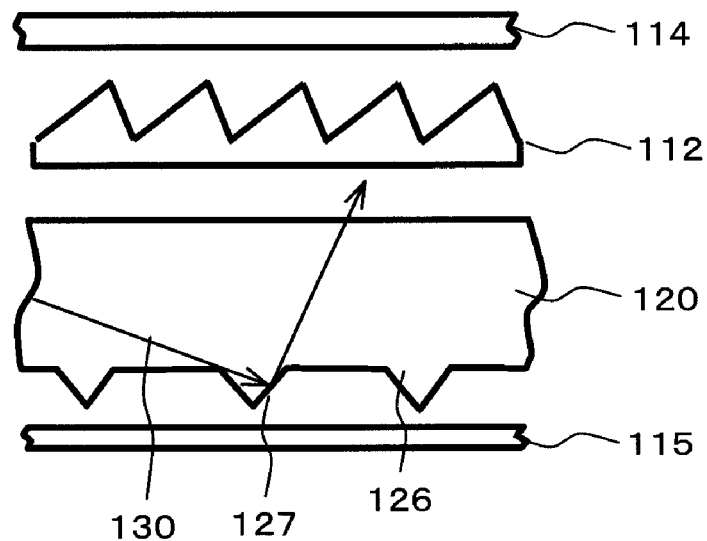
FIG. 4A and FIG. 4B are schematic cross-sectional views showing the light guide plate of the liquid crystal display device of the embodiment according to the present invention.
Figure 4B:
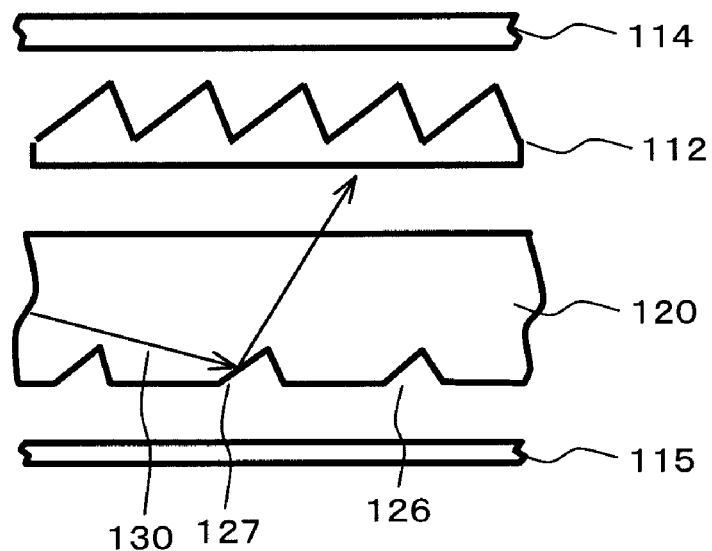

Next, the explanation is made with respect to the light which is reflected by the grooves 126 in conjunction with FIG. 4A and FIG. 4B. FIG. 4A shows a case in which the grooves 126 project outwardly, and FIG. 4B shows a case in which the grooves 126 project inwardly. The groove 126 includes reflection surfaces (also referred to as inclination surfaces) 127, wherein the reflection surface 127 makes an angle of 1 to 35 degrees with respect to the lower surface 122. The light which is reflected on the reflection surface 127 is radiated while expanding outwardly at a large angle with respect to the direction perpendicular to the upper surface 121 of the light guide plate 120 (an obtuse angle with respect to the upper surface 121). Accordingly, on the light guide plate 120, a prism sheet 112 is formed to reflect and to refract the outgoing light which advances toward a liquid crystal panel (not shown in the drawing) side. Here, numeral 114 indicates a diffusion plate, and numeral 115 indicates a reflection sheet.

The prism sheet 112 shown in FIG. 4 has prisms each of which includes an asymmetric cross section consisting of left and right inclined surfaces which differ from each other in length. The prism sheet with the prisms having the asymmetric cross section (hereinafter referred to as an asymmetric prism sheet) 112 is effective when a light radiated from the light guide plate 120 has directivity.

Conventionally, it has been desired that a light radiated from the light guide plate has no directivity. However, the use of the grooves 126 gives rise to a drawback that not directivity is often generated. Accordingly, an attempt has been made to effectively make use of the asymmetric prism sheet 112 even when a light radiated from the light guide plate 120 has directivity with the use of the asymmetric prism sheet 112.

In such an attempt to use the asymmetric prism sheet 112, the following is found. That is, when the asymmetric prism sheet 112 is used, contrary to the conventional constitution, by imparting directivity to a light radiated from the light guide plate 120 and by setting an angle of light which is incident on the asymmetric prism sheet 112 within a fixed range, it is possible to efficiently radiate a light to the liquid crystal panel.

As described previously, when an angle of light becomes equal to or exceeds the critical angle, the light is radiated from the light guide plate 120. Accordingly, the light which advances in the inside of the light guide plate 120 is reflected on the inner surfaces of the light guide plate 120 at an angle smaller than the critical angle. The light which is reflected in the inside of the light guide plate 120 is reflected on a reflection surface 127 of the groove 126. Accordingly, provided that an angle of the reflection surface 127 is fixed, it is also possible to make lights radiated from the light guide plate 120 have an equal angle.

However, it is found that, even when the angles of the reflection surfaces 127 are set equal, the distribution of angles of radiation lights changes corresponding to distances of the reflection surfaces 127 from the LED 150 in the light guide plate 120. Lights 130-1, 130-2, 130-3, 130-4 radiated from four points which differ from each other in distance from the LED 150 are shown in FIG. 5.

Figure 5:
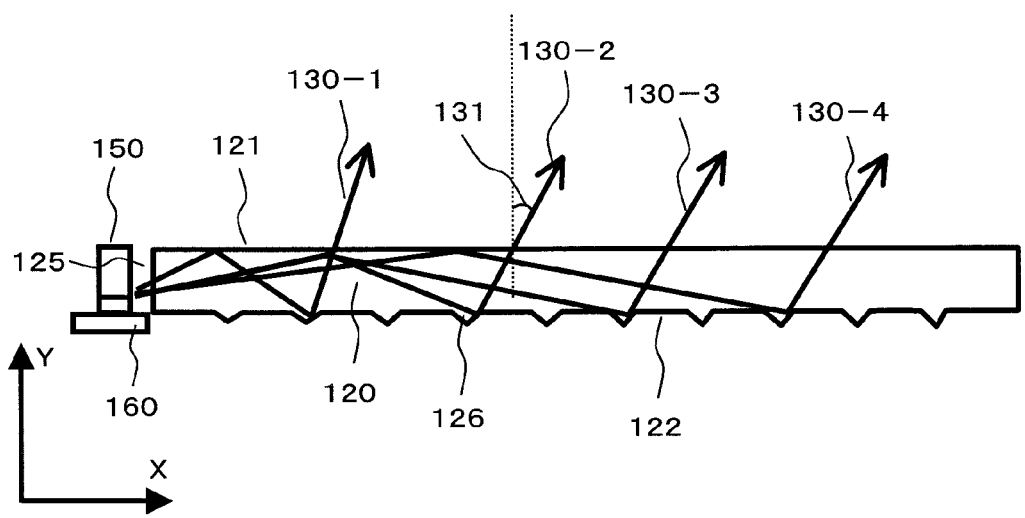
FIG. 5 is a schematic cross-sectional view showing the light guide plate of the liquid crystal display device of the embodiment according to the present invention.
Figure 6:
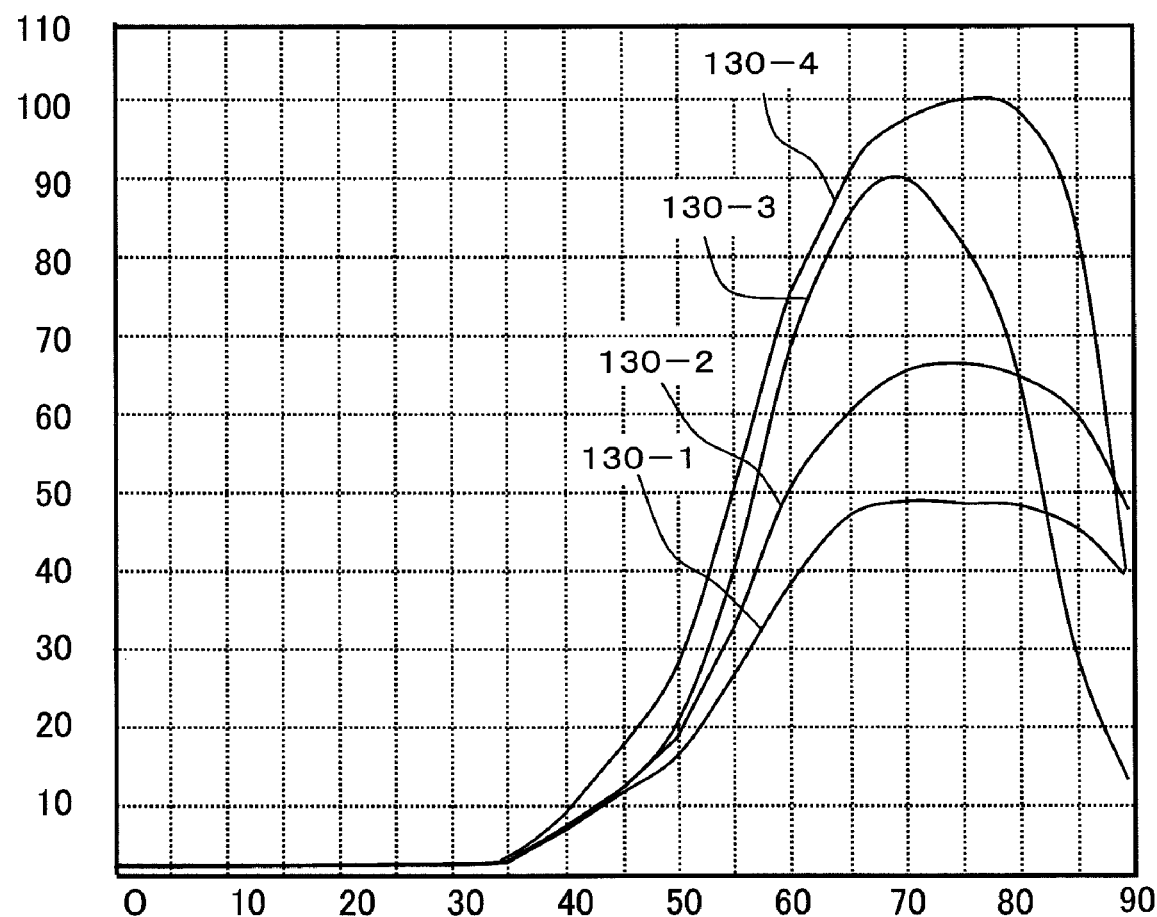
FIG. 6 is a graph showing a drawback in using the light guide plate of the liquid crystal display device of the embodiment according to the present invention.

Further, the distribution of angles of the lights radiated from four points shown in FIG. 5 (angles of lights with respect to a normal line of the upper surface 121) 131 is shown in FIG. 6. In FIG. 6, an axis of ordinates indicates a percentage assuming an in-plane maximum intensity of light on the light radiation surface as 1. Further, in FIG. 6, an axis of abscissas indicates an angle when the direction along which the distance is increased in the X-axis direction from the LED 150 with respect to the normal direction of the upper surface 121 in FIG. 5 is set as the positive direction.

With respect to the radiation light 130-1 radiated at a position close to the LED 150, the effective intensity of light is widely distributed from 60 degrees to 85 degrees. On the other hand, with respect to the radiation light 130-3 radiated at a position away from the LED 150, the intensity of light has a peak thereof in the vicinity of an angle of 70 degrees and the effective intensity of light has a narrow distribution range.

This implies that, in the vicinity of the LED 150, the light in the inside of the light guide plate 120 is distributed at various angles although these angles are angles larger than the critical angle. Further, the distribution of angles is narrowed along with the increase of distance from the LED 150. This also implies that factors which deteriorate the directivity are reduced.

Accordingly, inventors of the present invention have studied a possibility of reflecting lights which are incident on the lower surface 122 with limited angles on the reflection surface 127 among lights which propagate in the inside of the light guide plate 120 such that the lights are radiated at a fixed angle irrespective of the distance from the LED 150. Further, inventors of the present invention have also studied the constitution which can reduce factors deteriorating the directivity. Next, lights which are reflected on the reflection surface 127 are explained in conjunction with FIG. 7 to FIG. 10.

First of all, the explanation is made with respect to an angle after reflection of light which is reflected on the reflection surface 127 which intersects the lower surface 122 at an angle $\alpha$ in conjunction with FIG. 7. FIG. 7 shows a case in which light 134-1 arranged parallel to the lower surface 122 is incident on the reflection surface 127. The incident light 134-1 is reflected on the reflection surface 127 at a point O thus forming a reflection light 134-2. An angle 135 made by the reflection light 134-2 and the lower surface 122 becomes $2\alpha$ since an angle AOB and an angle OBA of a triangle OAB respectively become an angle $\alpha$ respectively.

In this manner, when the angle made by the reflection surface 127 and the lower surface 122 is $\alpha$, light which is reflected on the reflection surface 127 is reflected on the lower surface 122 at an increased angle $2\alpha$.

Next, the explanation is made with respect to a case in which a light making a critical angle with respect to the lower surface 122 is incident on the reflection surface 127 in conjunction with FIG. 8. An incident light 134-3 is a light which makes an angle 136 with respect to a normal line 132 of the lower surface 122, wherein the angle 136 is a critical angle. Here, assuming that the reflection surface 127 is inclined by an angle $\alpha$ with respect to the lower surface 122, an angle of the incident light 134-3 is decreased from the critical angle by an amount of angle $\alpha$ with respect to the normal direction of the reflection surface 127. Accordingly, the incident light 134-3 is radiated to the outside of the light guide plate 120 from the reflection surface 127.

Next, an incident light 134-4 which makes an angle made by adding a critical angle and an angle $\alpha$ with respect to the normal line 132 is considered in conjunction with FIG. 8. The incident light 134-4 is incident on the reflection surface 127 at the critical angle, and a light having an angle larger than the angle of the incident light 134-4 is reflected by total reflection on the reflection surface 127 and forms reflection light 134-5, and the reflection light 134-5 advances toward the upper surface 121.

Here, the light 134-4 which makes the angle made by adding the angle $\alpha$ to the critical angle with respect to the normal line 132 is reflected on the reflection surface 127 thus forming the reflection light 134-5 which makes an angle made by subtracting an angle $\alpha$ from the critical angle with respect to the normal line 132, and the reflection light 134-5 advances toward the upper surface 121. A light which is incident on the reflection surface 127 at an angle ranging from the angle of the light 134-4 made by adding the angle $\alpha$ to the critical angle to an angle made by adding an angle $2\alpha$ to the critical angle forms a light 134-7 which makes an angle equal to or lower than a critical angle with respect to the normal line 132 of the upper surface 121, and the light 134-7 advances toward the upper surface 121. Accordingly, lights ranging from the light 134-4 which is incident on the reflection surface 127 at the angle made by adding the critical angle to the angle $\alpha$ with respect to the normal line 132 to the light 134-6 which is incident on the reflection surface 127 at the angle made by adding the critical angle to the angle $2\alpha$ is radiated to the outside of the light guide plate 120 from the upper surface 121.

Figure 9:
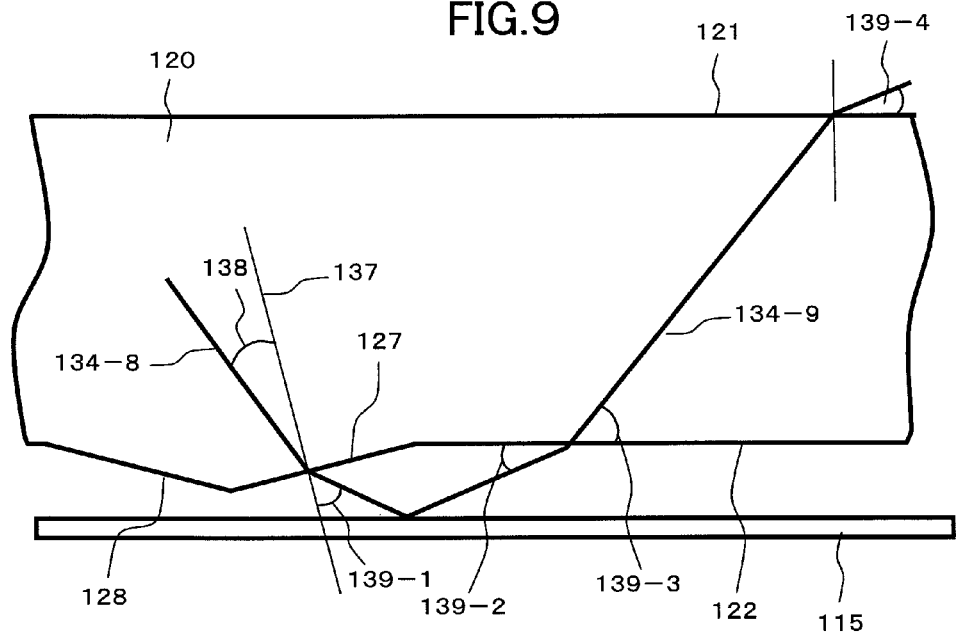
FIG. 9 is a schematic view showing the light guide plate of the liquid crystal display device of the embodiment according to the present invention.

Next, a light radiated from the reflection surface 127 is explained in conjunction with FIG. 9. Here, for the sake of brevity, the explanation is made with respect to a case in which a refraction index of the light guide plate 120 is set to 1.59. A critical angle of the reflection surface 127 is set to 38.97 degrees. Further, the explanation is made by setting an angle made by the reflection surface 127 and the lower surface 122 to 1 degree for enhancing the directivity of a light radiated from the light guide plate 120.

First of all, a light which is incident on the lower surface 122 at the critical angle is explained. An angle made by an incident light 134-8 and the normal line 137 of the reflection surface 127 shown in FIG. 9 becomes 37.97 degrees. Since the incident light 134-8 is incident on the reflection surface 127 at the angle smaller than the critical angle 38.97 degrees, the incident light 134-8 is radiated to the outside of the light guide plate 120. Here, a radiation angle 139-1 of the light made with respect to a normal line 137 becomes 78.0 degrees based on the Snell's law.

A light which is radiated from the light guide plate 120 is reflected on a reflection sheet 115, and is again incident on the light guide plate 120. Here, an incident angle 139-2 of the light which is made with respect to the lower surface 122 of the light guide plate 120 is increased by an angle corresponding to the inclination of the reflection surface 127, and the light is incident on the lower surface 122 at an angle of 79.0 degrees.

An angle 139-3 which a light 134-9 incident on the light guide plate 120 makes with respect to the normal direction of the lower surface 122 becomes 38.12 degrees based on the Snell's law. Further, the light 134-9 is also incident at an angle of 38.12 degrees with respect to the normal direction of the upper surface 121 parallel to the lower surface 122. Due to such an angle set smaller than the critical angle of 38.97 degrees, the light 134-9 is radiated from the upper surface 121. Here, an angle 139-4 of the radiation light made with respect to the normal direction of the upper surface 121 becomes 79.0 degrees based on the Snell's law.

Next, the explanation is made with respect to a case in which, as an angle of a boundary which prevents the radiation on the reflection surface 127, an angle which is made with respect to the normal line 137 of the reflection surface 127 is set to a value slightly smaller than the critical angle of 38.97 degrees. In this case, although a radiation angle 139 with respect to the normal line 137 approximates the direction parallel to the reflection surface 127 as much as possible, the radiation light makes an angle at least with respect to the reflection sheet and hence, the radiation light is reflected on the reflection sheet 115 and is incident on the light guide plate 120.

Here, the light which is incident on the light guide plate 120 is radiated at the same angle as the angle at which the light is incident on the light guide plate 120 and hence, the incident light is radiated from the reflection surface 127, is reflected on the reflection sheet 115, is again incident on the light guide plate 120, and is radiated from the upper surface 121. The light radiated from the upper surface 121 becomes a light which advances in the direction substantially parallel to the upper surface 121. From the above-mentioned incidence and reflection of the light, the light radiated from the reflection surface 127 assumes the above-mentioned distribution of angle ranging from 79.0 degrees to 90 degrees with respect to the normal direction of the upper surface 121 when the light is radiated from the upper surface 121.

Here, when the angle of the inclination of the reflection surface 127 is 2 degrees, the angle 139-2 at which the light is again incident on the light guide plate 120 after being radiated from the reflection surface 127 and being reflected on the reflecting sheet 115 is increased by an angle corresponding to the inclination of the reflection surface 127 and hence, the light is incident on the lower surface 122 at an angle of 80.0 degrees. Accordingly, the radiation light from the upper surface 121 assumes the distribution of angle ranging from 80 degrees to 90 degrees. Accordingly, it is understood that along with the increase of the inclination of the reflection surface 127, the distribution of angle is moved to a 90-degree side. Further, out of the lights which are radiated from the reflection surface 127, the light which becomes substantially parallel to the reflection surface 127 is incident on the light guide plate 120 from the inclination surface 128 which faces the reflection surface 127 in an opposed manner and becomes a factor which deteriorates the directivity of the radiation light.

Figure 10:
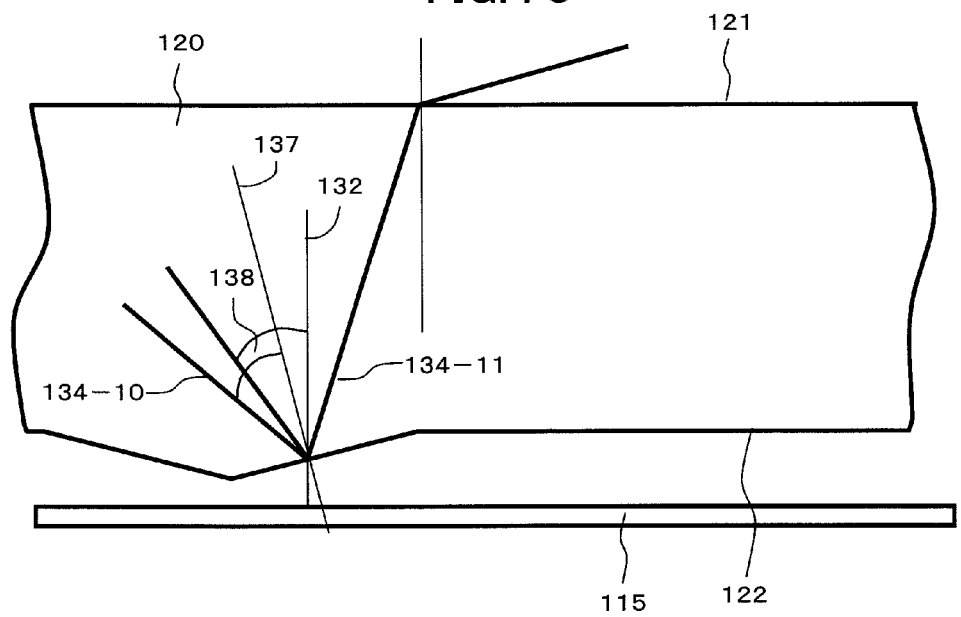
FIG. 10 is a schematic view showing the light guide plate of the liquid crystal display device of the embodiment according to the present invention.

Next, a light which is reflected on the reflection surface 127 and is radiated from the upper surface 121 is explained in conjunction with FIG. 10. Firstly, an incident light 134-10 which makes an angle of 39.97 degrees with respect to the normal line 132 is explained as an angle of a boundary which prevents the radiation of light on the reflection surface 127. In this case, as described above, an angle of the radiation light made with respect to the upper surface 121 is decreased by an angle twice as large as an angle of the reflection surface 127 and hence, the angle becomes 37.97 degrees. Here, the angle of the radiation light made with respect to the normal direction of the upper surface 121 becomes 78.0 degrees based on the Snell's law.

Next, as an angle of boundary which prevents the radiation of the reflection light 134-11 from the upper surface 121, the incident light 134-10 which makes an angle of 40.97 degrees with respect to the normal line 132 is explained. In this case, an angle of the radiation light made with respect to the upper surface 121 is decreased by an angle twice as large as an angle of the reflection surface 127 and hence, the angle becomes 38.97 degrees. Here, the angle of the radiation light made with respect to the normal direction of the upper surface 121 becomes approximately 90 degrees based on the Snell's law.

Here, the angle of the radiation light made with respect to the normal direction of the upper surface 121 becomes 73.1 degrees based on the Snell's law. Accordingly, the lights reflected on the reflection surface 127 are distributed within a range of angle from 78.0 degrees to 73.1 degrees when the reflection light is radiated from the upper surface 121.

Figure 11:
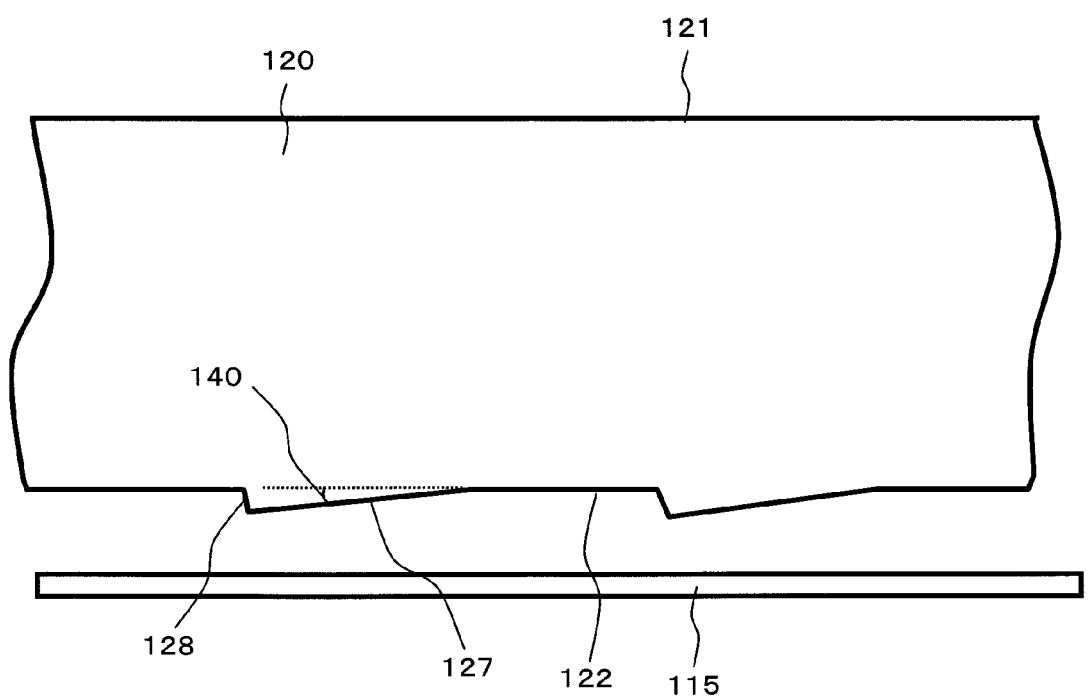
FIG. 11 is a schematic view showing the light guide plate of the liquid crystal display device of the embodiment according to the present invention.

To decrease the above-mentioned drawback that the distribution of lights radiated from the upper surface 121 due to the lights radiated from the reflection surface 127 spreads, the angle of the reflection surface 127 is made as small as possible and, at the same time, an area of the inclination surface 128 is also made as small as possible. FIG. 11 shows the light guide plate 120 having grooves 126 in which an angle made by the reflection surface 127 and the lower surface 122 is set to 1 degree and an area ratio of the inclination surface 128 with respect to the reflection surface 127 is set to one/tenth or less.

Figure 12:
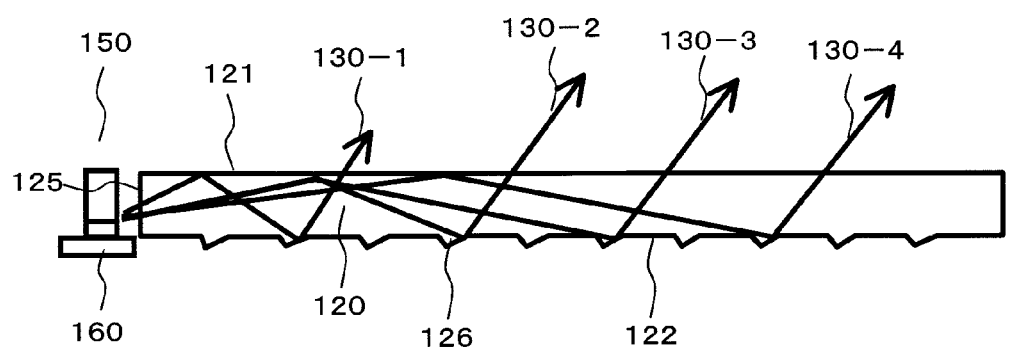
FIG. 12 is a schematic view showing the light guide plate of the liquid crystal display device of the embodiment according to the present invention.

When the distribution of angle of lights radiated from the light guide plate 120 shown in FIG. 11 is measured, it is found from the measurement data that all lights radiated from respective points exhibit peaks within a range of angle from 70 degrees to 80 degrees and exhibit narrow distribution widths. FIG. 12 shows a state of the radiation lights when the angle of the reflection surface 127 is set to 1 degree. As shown in FIG. 12, although the distribution of radiation angles of lights from the respective points becomes uniform, the light guide plate 120 shown in FIG. 12 gives rise to a drawback that the intensity of the light 130-1 radiated from the point close to an LED 150 is lowered.

Figure 13A:
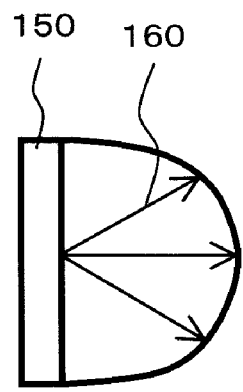
FIG. 13A and FIG. 13B are schematic views showing radiation light of an LED of the liquid crystal display device of the embodiment according to the present invention.

FIG. 13 shows the light in the vicinity of the LED 150. The light 160 radiated from the LED 150 is ideally considered as a light having uniform intensity within a range of angle from −90 degrees to 90 degrees as shown in FIG. 13A.

Figure 13B:
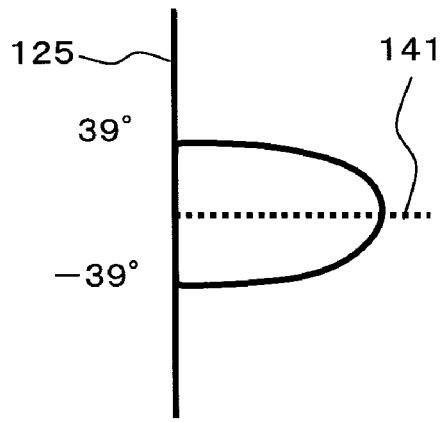

However, as shown in FIG. 13B, when a refractive index of the light guide plate 120 is set to 1.59, even the light which is incident on the incident surface 125 at 90 degrees with respect to the normal direction of the incident surface 125 becomes the light having an angle of 39.0 degrees in the inside of the light guide plate 120 based on the Snell's law. Accordingly, the light becomes a light which makes an angle of 51.0 degrees or less with respect to the normal direction 141 of the upper surface 121 or the lower surface 122.

Figure 14:
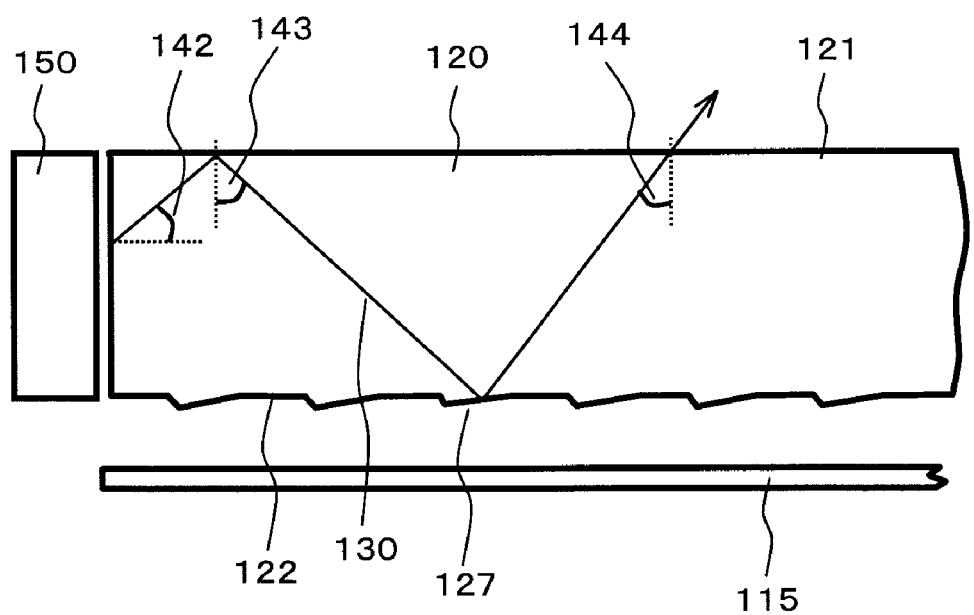
FIG. 14 is a schematic view showing the light guide plate of the liquid crystal display device of the embodiment according to the present invention.

Accordingly, as shown in FIG. 14, even when the light 130 which is incident from the incident surface 125 at an angle 142 of 39.0 degrees with respect to the normal direction is reflected at an angle 143 of 51 degrees with respect to the upper surface 121 and, subsequently, the light 130 is reflected on the reflection surface 127 having the angle of 1 degree one time, the angle 143 at which the light is incident on the upper surface 121 assumes an angle which becomes acuter by 2 degrees for every reflection and becomes 49 degrees and hence, the angle does not exceed a critical angle of 38.97 degrees. That is, when the angle becomes an acute angle by increasing 2 degrees for every reflection, when the angle exceeds the critical angle of 38.97 degrees, it is necessary to perform the reflection of light six times or more. Accordingly, when the angle of the reflection surface 127 is 1 degree, in the vicinity of the LED 150, there arises a drawback that a light radiated from the upper surface 121 is extremely decreased.

Figure 15:
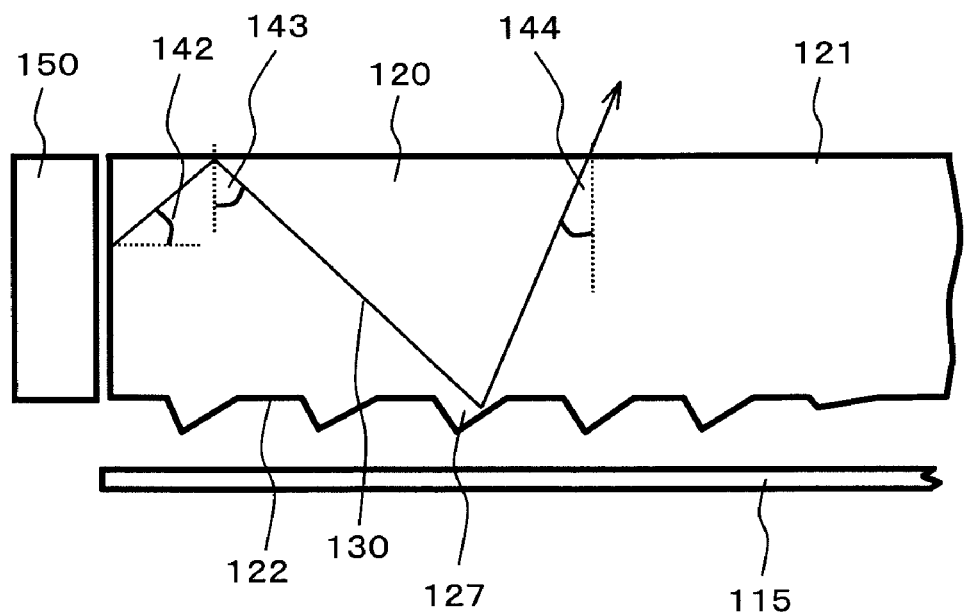
FIG. 15 is a schematic view showing the light guide plate of the liquid crystal display device of the embodiment according to the present invention.

FIG. 15 shows the light guide plate 120 in which, in the vicinity of the LED 150, the angle of the reflection surface 127 is set to an angle which exceeds the critical angle by performing the reflection one time or twice. When the refractive index is set to 1.59, the angle is set to 6 degrees ((51 degrees−39 degrees)/2=6 degrees).

That is, a main part of the light guide plate 120 is formed such that the angle made by the reflection surface 127 and the lower surface 122 is set to an angle equal to or less than (((90 degrees−critical angle)−critical angle)/2), and an area of the reflection surface 127 is set larger than an area of the inclination surface (another surface of the groove) 128 so as to restrict the distribution of angle of the lights radiated from the upper surface 121 of the light guide plate 120 within a narrow range. In such a case, in the vicinity of the LED 150, to increase the intensity of the radiation light, the angle of the reflection surface 127 is set to an angle equal to or more than (((90 degrees−critical angle)−critical angle)/2).

Due to such a constitution, it is possible to acquire the light guide plate 120 which can sufficiently perform functions thereof with respect to the asymmetric prism sheet 112.

Figure 16:
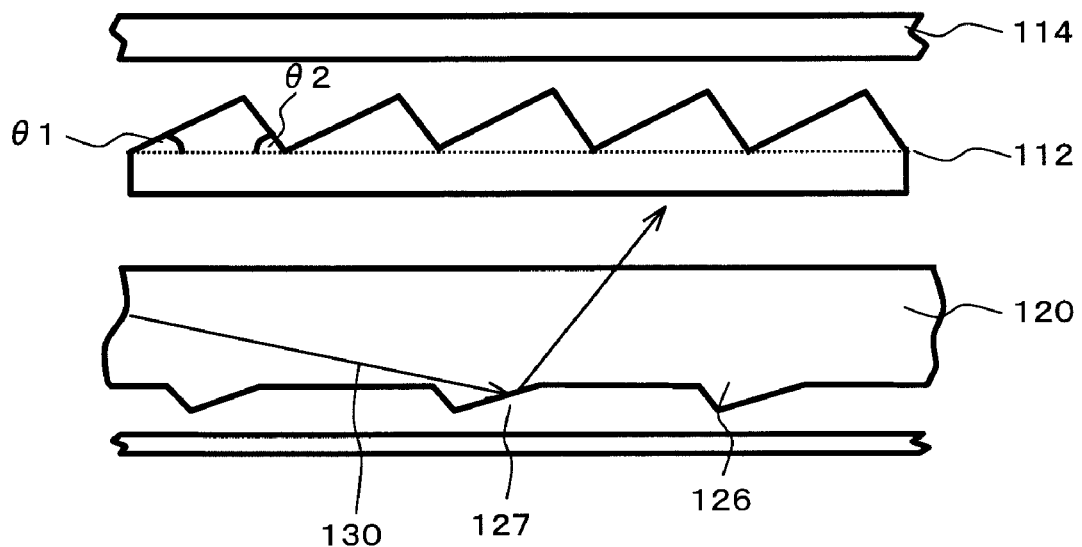
FIG. 16 is a schematic view showing a prism sheet of the liquid crystal display device of the embodiment according to the present invention.

Next, the asymmetric prism sheet 112 is explained in conjunction with FIG. 16 to FIG. 29. The asymmetric prism sheet 112 shown in FIG. 16 forms a plurality of prisms having an upwardly projecting triangular cross section on an upper surface thereof, and lengths of neighboring slopes are set such that the length of the slope on the light-source-side slope is larger than the length of the another-side slope. An angle made by the slope and the bottom surface is set such that an angle θ1 on the light source side is set to 57 degrees and an angle θ2 on another side is set to 69 degrees.

The light having the radiation angle of approximately 70 degrees is radiated from the light guide plate 120 and is radiated to the asymmetric prism sheet 112. Accordingly, in the asymmetric prism sheet 112, it is possible to allow the light having the radiation angle of approximately 70 degrees to be efficiently radiated in the liquid crystal panel direction. When necessary, a diffusion sheet 114 may be mounted on the asymmetric prism sheet 112.

Figure 17:
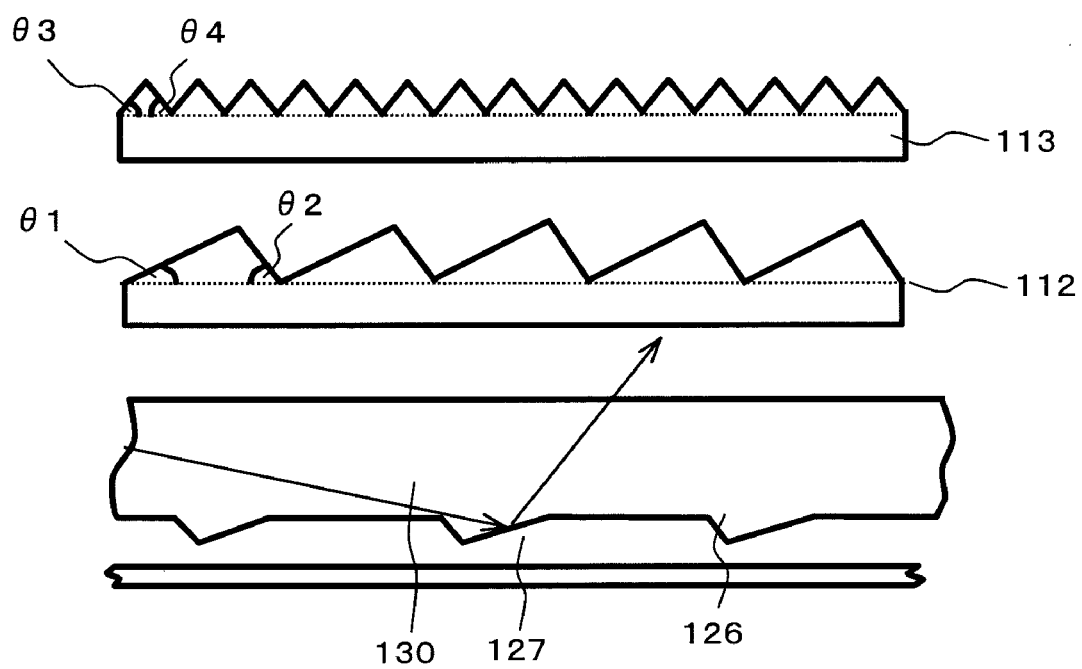
FIG. 17 is a schematic view showing the prism sheet of the liquid crystal display device of the embodiment according to the present invention.

Next, FIG. 17 shows a case in which two asymmetric prism sheets 112, 113 are arranged in an overlapping manner. An angle θ1 is set to 50 degrees and an angle θ2 is set to 60 degrees with respect to the asymmetric prism sheet 112 on a lower side, while an angle θ3 is set to an angle which falls within a range from 35 degrees to 90 degrees and an angle θ4 is set to 35 degrees with respect to the asymmetric prism sheet 113 on an upper side.

Further, a pitch of the prisms of the asymmetric prism sheet 112 is preferably three times or more as large as a pitch of the prisms of the asymmetric prism sheet 113. The upper-side asymmetric prism sheet 113 may be provided in place of the diffusion sheet 114 for scattering light. Further, the upper-side asymmetric prism sheet 113 may be also provided for directing light in the specific direction.

Figure 18:
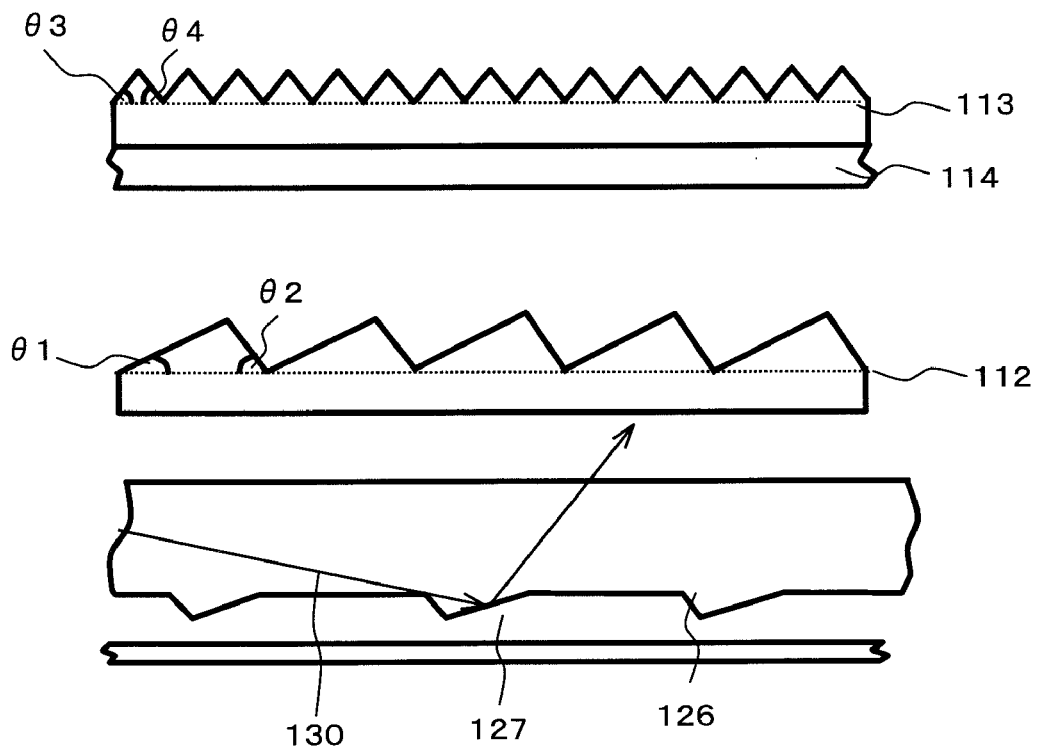
FIG. 18 is a schematic view showing the prism sheet of the liquid crystal display device of the embodiment according to the present invention.

Further, as shown in FIG. 18, the diffusion sheet 114 and the asymmetric prism sheet 113 may be formed in an overlapping manner. Such a structure can particularly direct light in the specific direction using the asymmetric prism sheet 113.

Figure 19:
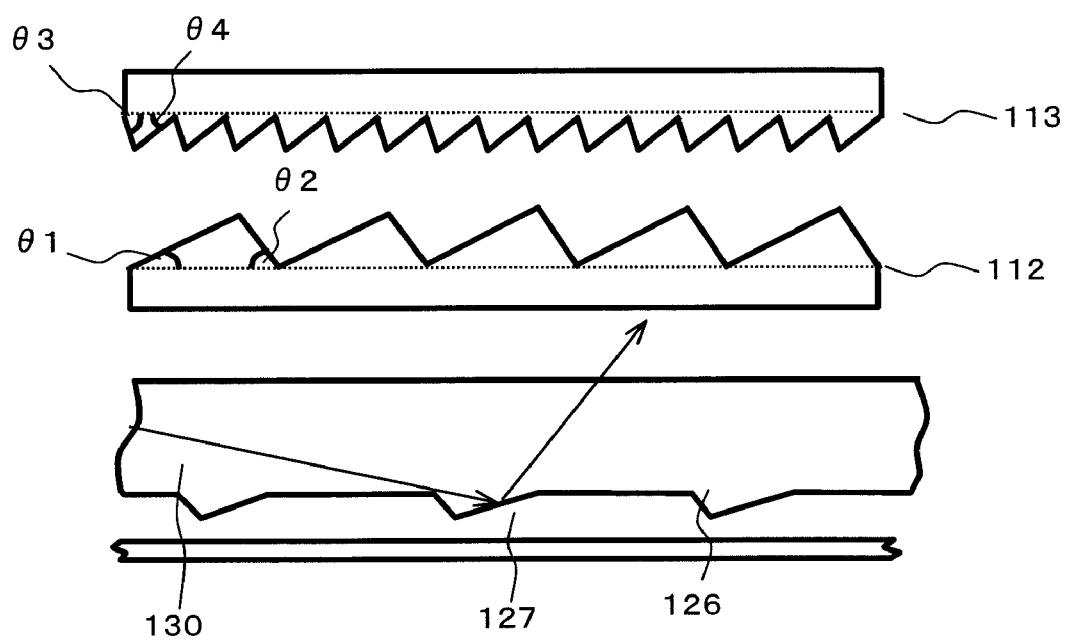
FIG. 19 is a schematic view showing the prism sheet of the liquid crystal display device of the embodiment according to the present invention.

Next, as shown in FIG. 19, the asymmetric prism sheet 113 may be arranged above the asymmetric prism sheet 112 in a state that the asymmetric prism sheet 113 has prisms thereof directed downwardly. By setting the angles θ3, θ4 of the asymmetric prism sheet 113 to 90 degrees and 18 degrees respectively and by setting the angles θ1, θ2 of the asymmetric prism sheet 112 to 60 degrees and 70 degrees respectively, the asymmetric prism sheets can be effectively used even when the light radiated from the light guide plate 120 is further inclined toward the light-radiation-surface side (when the angle is increased with respect to the normal direction).

Figure 20:
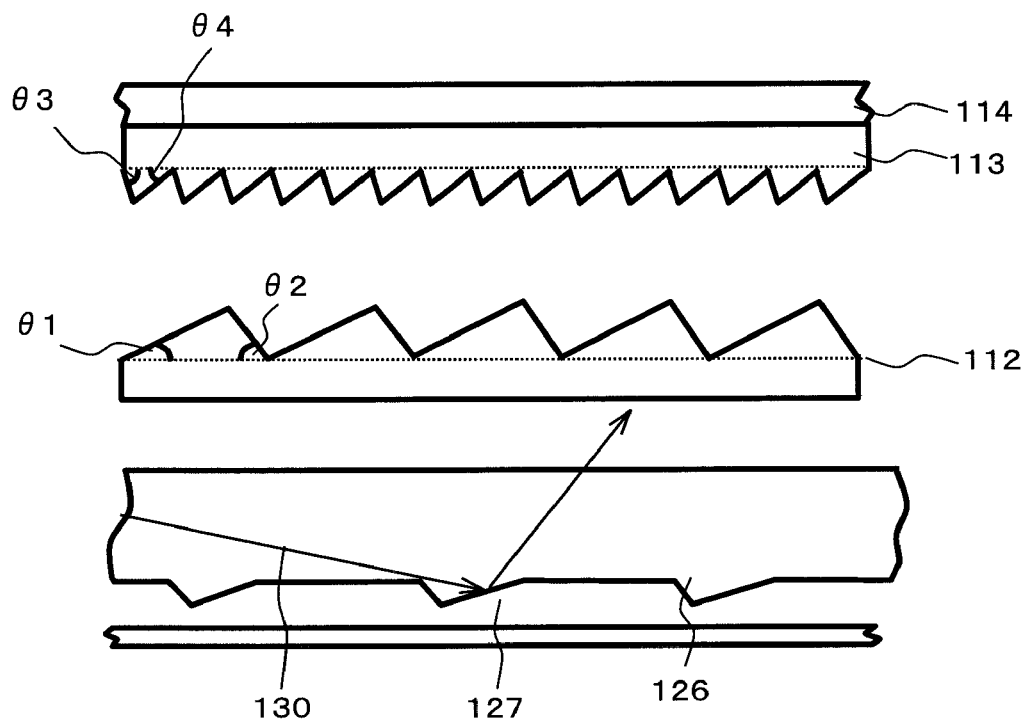
FIG. 20 is a schematic view showing the prism sheet of the liquid crystal display device of the embodiment according to the present invention.

As shown in FIG. 20, the diffusion sheet 114 may be arranged above the asymmetric prism sheet 113 having the prisms thereof directed downwardly in an overlapping manner. Even when the structure which is formed by overlapping the asymmetric prism sheet 113 to the asymmetric prism sheet 112 is adopted, the structure is effectively used when a specific light is conspicuous.

Figure 21:
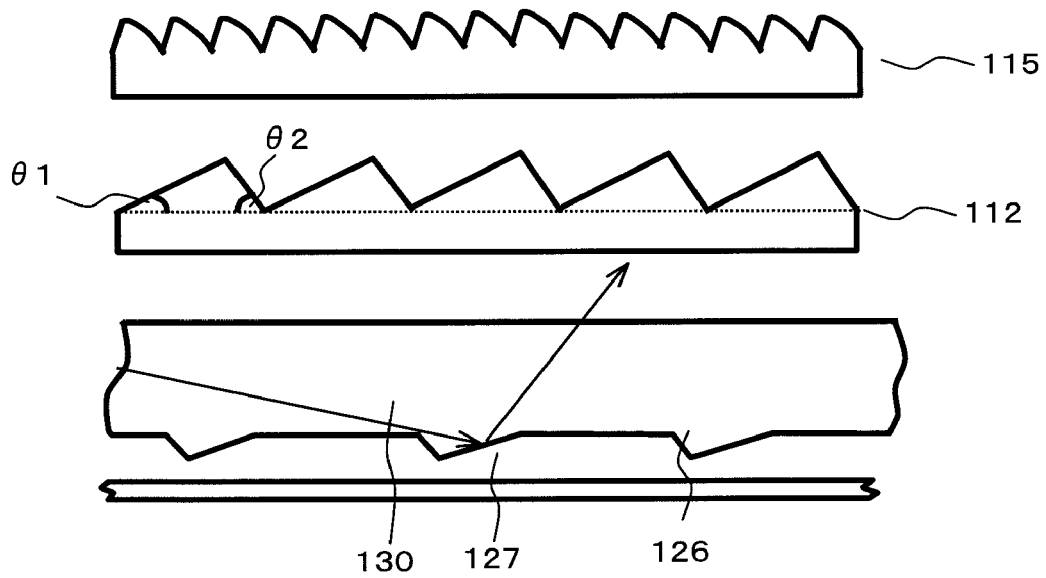
FIG. 21 is a schematic view showing the prism sheet of the liquid crystal display device of the embodiment according to the present invention.

FIG. 21 shows a case in which an asymmetric lenticular lens array 115 is arranged above the asymmetric prism sheet 112 in an overlapping manner. In this case, it is effective to set an angle θ1 of the asymmetric prism sheet 112 to a value which falls within a range from 65 degrees to 90 degrees, and to set an angle θ2 of the asymmetric prism sheet 112 to 65 degrees.

Figure 22:
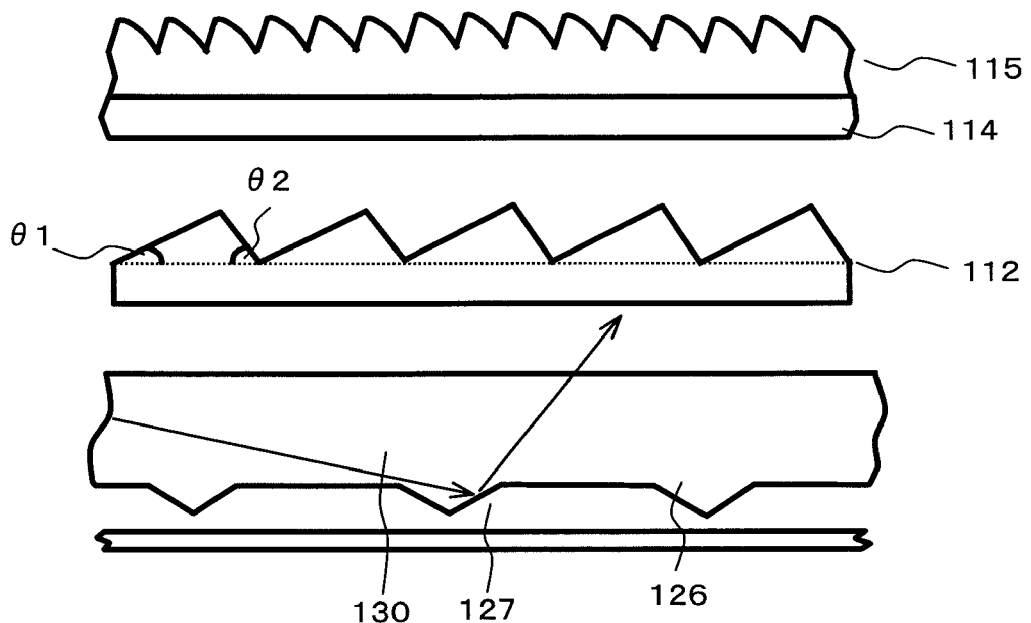
FIG. 22 is a schematic view showing the prism sheet of the liquid crystal display device of the embodiment according to the present invention.

FIG. 22 shows a case in which the diffusion sheet 114 is arranged below the asymmetric lenticular lens array 115. It is more advantageous to provide the asymmetric lenticular lens array 115 and the diffusion sheet 114 in an overlapping manner.

Figure 23:
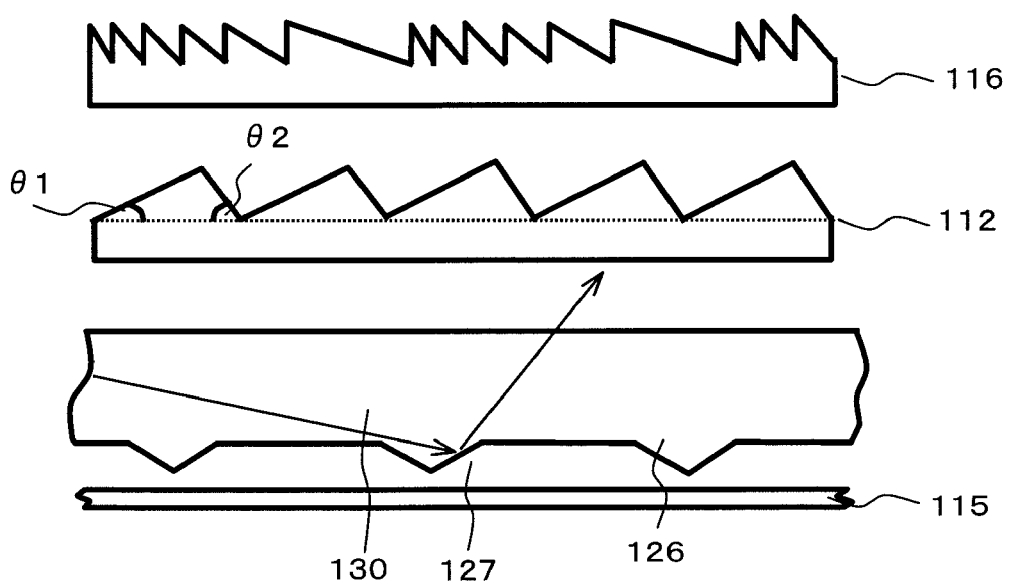
FIG. 23 is a schematic view showing the prism sheet of the liquid crystal display device of the embodiment according to the present invention.

FIG. 23 shows a case in which a Fresnel lens 116 is arranged above the asymmetric prism sheet 112 in an overlapping manner.

Figure 24:
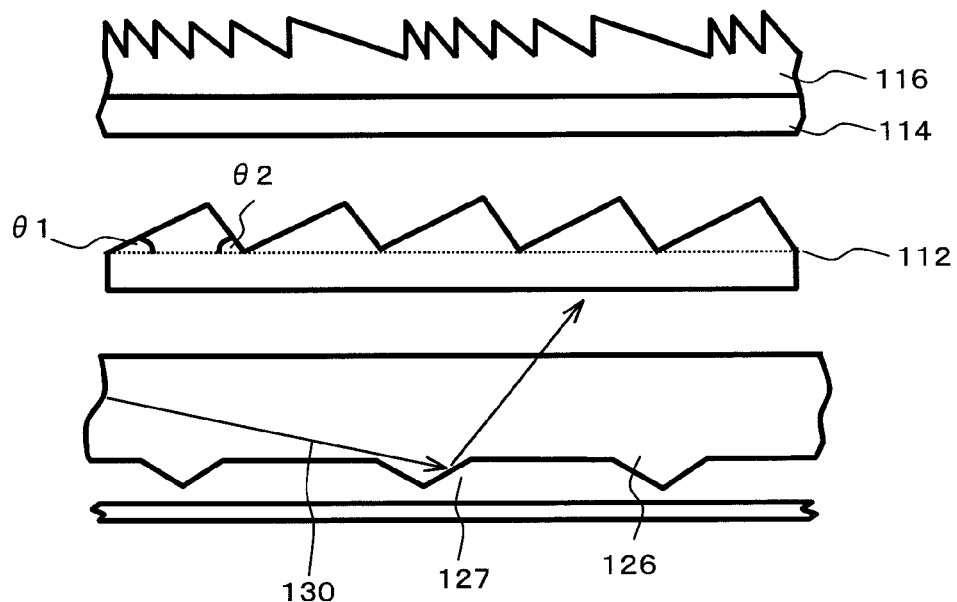
FIG. 24 is a schematic view showing the prism sheet of the liquid crystal display device of the embodiment according to the present invention.

FIG. 24 shows a case in which the diffusion sheet 114 is arranged below the Fresnel lens 116 in an overlapping manner.

Figure 25:
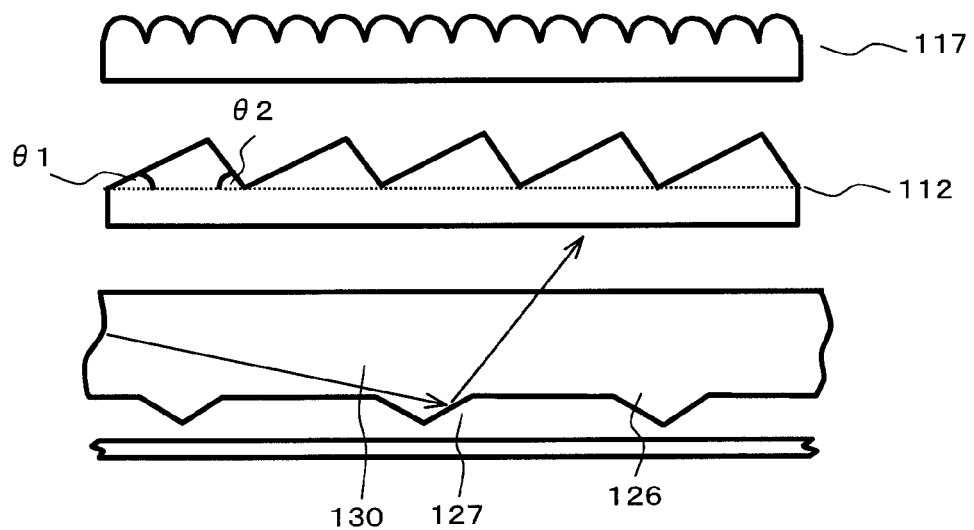
FIG. 25 is a schematic view showing the prism sheet of the liquid crystal display device of the embodiment according to the present invention.
Figure 26:
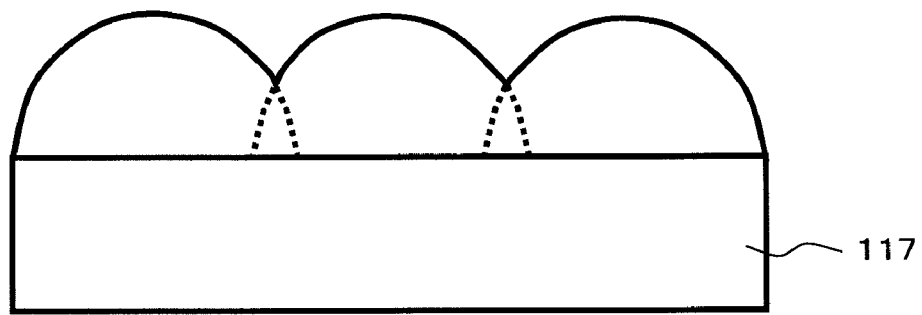
FIG. 26 is a schematic cross-sectional view showing a microlens array of the liquid crystal display device of the embodiment according to the present invention.
Figure 27:
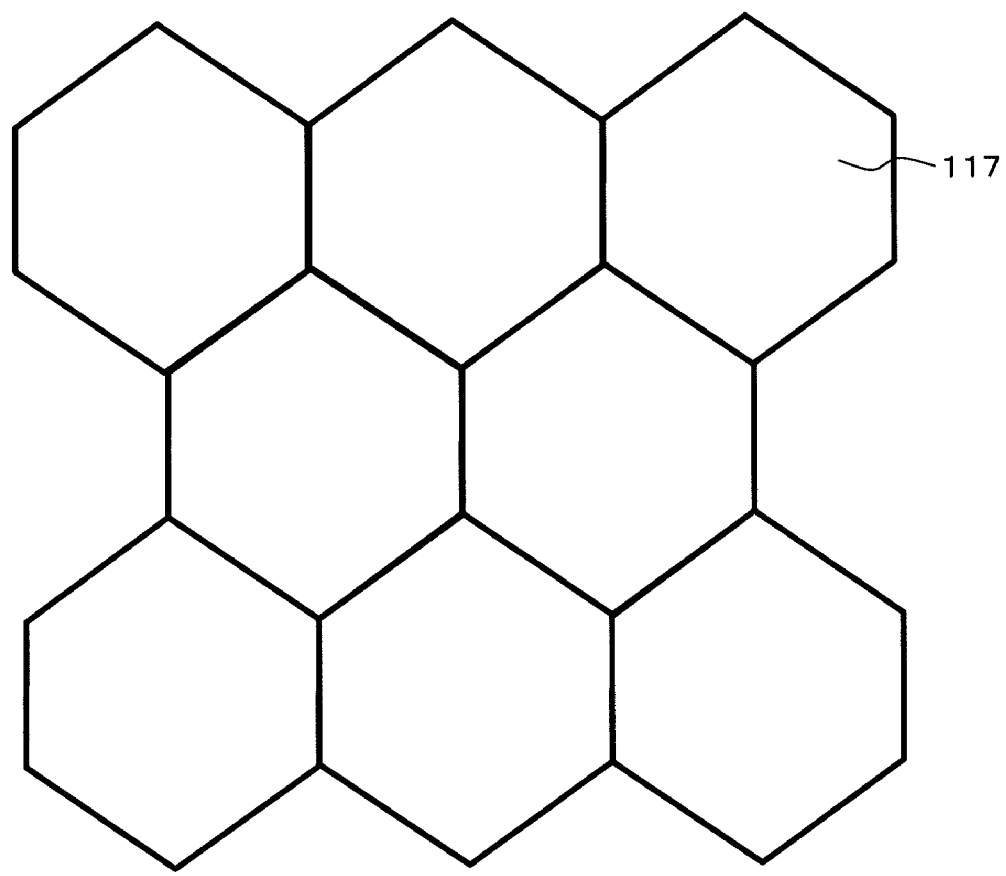
FIG. 27 is a schematic plan view showing the microlens array of the liquid crystal display device of the embodiment according to the present invention.

FIG. 25 shows a case in which a microlens array 117 is arranged above the asymmetric prism sheet 112 in an overlapping manner. FIG. 26 is a cross-sectional view of the microlens array 117 and FIG. 27 is a plan view of the microlens array 117.

The microlens array 117 is constituted of small semispherical lenses which are formed finely in plane. As shown in FIG. 27, to prevent the neighboring lenses from being in contact with each other, the lenses are formed in a hexagonal shape in a plan view.

Figure 28:
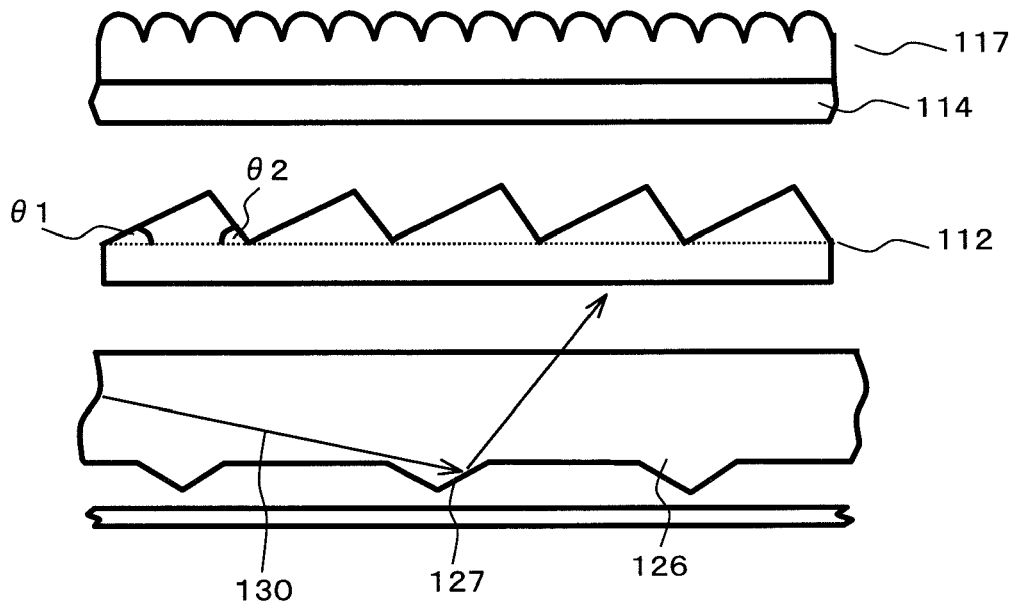
FIG. 28 is a schematic view showing the prism sheet of the liquid crystal display device of the embodiment according to the present invention.

FIG. 28 shows a case in which the diffusion sheet 114 is arranged below a lower surface of the microlens array 117 in an overlapping manner.

Figure 29:
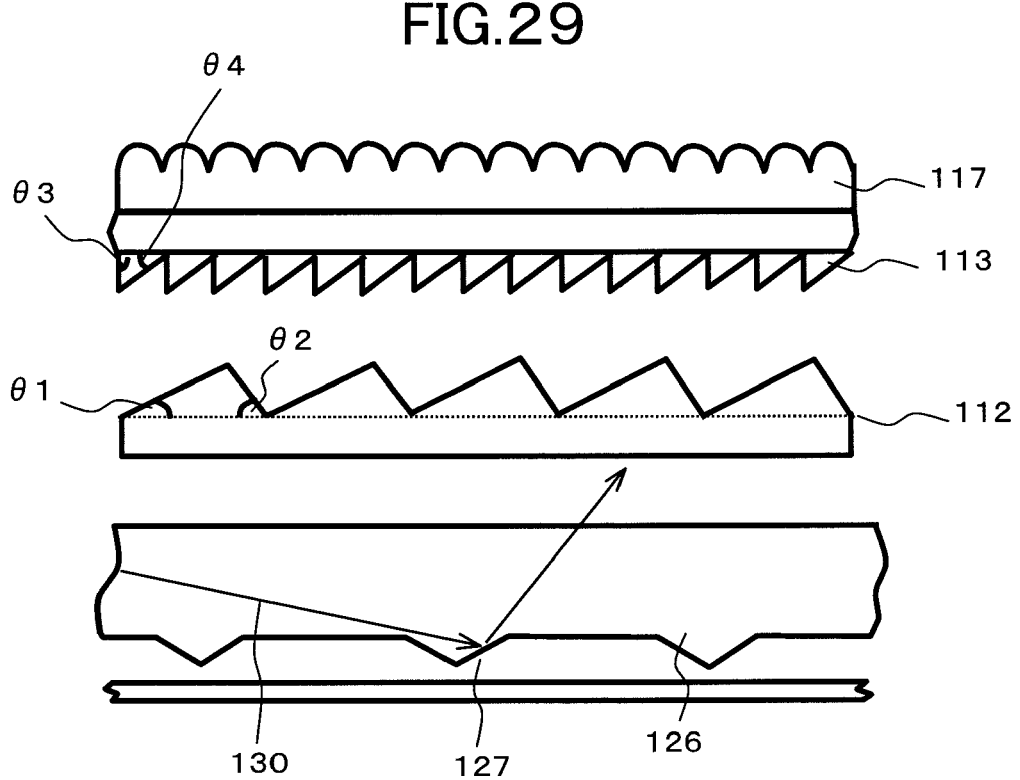
FIG. 29 is a schematic view showing the prism sheet of the liquid crystal display device of the embodiment according to the present invention.

FIG. 29 shows a case in which the asymmetric prism sheet 113 is arranged below the microlens array 117 in an overlapping manner. The pitch of the prisms of the asymmetric prism sheet 113 is set smaller than the pitch of the prisms of the asymmetric prism sheet 112.

What is claimed is:

1. A liquid crystal display device comprising:
    a liquid crystal panel;
    a backlight which radiates light to the liquid crystal panel;
    a light emitting element which is mounted on the backlight;
    a light guide plate on which light from the light emitting element is incident;
    the light guide plate having an upper surface which is arranged to face the liquid crystal panel;
    the light guide plate having a bottom surface which is arranged to face the upper surface;
    the bottom surface of the light guide plate having grooves formed therein delimited by at least a first slant surface and a second slant surface which extend at a slant at different angles with respect to the bottom surface, the first slant surface being arranged closer to a light emitting element side of the light guide plate than the second slant surface; and
    a reflection sheet which reflects the light radiated from the bottom surface;
    wherein a light reflected by at least one of the first slant surface, the second slant surface, and the reflection sheet radiate from the upper surface;
    wherein a peak of an intensity of the light radiated from the upper surface is inclined in a direction away from the light emitting element;
    wherein the grooves are formed to produce a first light which is reflected on the grooves and a second light which is radiated from the grooves and is reflected on the reflection sheet;
    wherein the angle of the first slant surface with respect to the bottom surface is greater than the angle of the second slant surface with respect to the bottom surface; and
    wherein an asymmetric prism sheet is arranged on the light guide plate.

2. A liquid crystal display device according to claim 1, wherein the light emitting element is an LED.

3. A liquid crystal display device according to claim 1, wherein the backlight includes an optical film between the upper surface of the light guide plate and the liquid crystal panel.

4. A liquid crystal display device comprising:
a liquid crystal panel; and
a flat lighting device which radiates a light to the liquid crystal panel;
wherein the flat lighting device includes:
a plurality of light emitting elements;
a light guide plate which radiates light from the light emitting elements to the liquid crystal panel;
the light guide plate having an upper surface which is arranged to face the liquid crystal panel in an opposed manner;
the light guide plate having a bottom surface which is arranged to face the upper surface in an opposed manner; and
the bottom surface having at least a first inclination surface and a second inclination surface formed thereon, the first and second inclination surfaces extending at different inclination angles with respect to the bottom surface;
wherein a first light is reflected on the first and second inclination surfaces;
wherein a second light is radiated from the first and second inclination surfaces;
wherein the first inclination surface is arranged closer to a light emitting elements side of the light guide plate than the second inclination surface, and the first inclination surface has a first angle with respect to the bottom surface which is greater than a second angle of the second inclination surface with respect to the bottom surface;
wherein the first and second light radiate from the upper surface;
wherein a peak of an intensity of the light radiated from the upper surface is inclined in a direction away from the light emitting elements; and
wherein an asymmetric prism sheet is arranged between the upper surface of the light guide plate and the liquid crystal panel.

5. A liquid crystal display device according to claim 4, wherein each of the light emitting elements is an LED.

6. A liquid crystal display device according to claim 4, wherein the flat lighting device includes an optical film between the upper surface of the light guide plate and the liquid crystal panel.

7. A liquid crystal display device comprising:
a liquid crystal display panel;
a backlight which radiates a light to the liquid crystal display panel;
a light emitting element which is mounted on the backlight;
a light guide plate on which light from the light emitting element is incident;
the light guide plate having a bottom surface;
the light guide plate having an upper surface which faces the bottom surface in an opposed manner; and
a reflection surface which is formed on the bottom surface of the light guide plate;
wherein the reflection surface includes a first reflection surface having a first angle and a second reflection surface having a second angle with respect to the bottom surface;
wherein the first angle is greater than the second angle;
wherein the light reflected on the first and second reflection surfaces are radiated from the upper surface;
wherein a peak of an intensity of the light radiated from the upper surface is inclined in a direction away from the light emitting element;
wherein the first reflection surface is arranged closer to a light emitting element side of the light guide plate than the second reflection surface; and
wherein an asymmetric prism sheet is arranged between the upper surface of the light guide plate and the liquid crystal display panel.

8. A liquid crystal display device according to claim 7, wherein the light emitting element is an LED.

9. A liquid crystal display device according to claim 7, wherein the backlight includes an optical film between the upper surface of the light guide plate and the liquid crystal display panel.

* * * * *